(12) United States Patent
Cheng et al.

(10) Patent No.: US 9,395,734 B2
(45) Date of Patent: Jul. 19, 2016

(54) CONTROL CIRCUIT OF POWER CONVERTER

(71) Applicant: Richtek Technology Corporation, Chupei, Hsinchu (TW)

(72) Inventors: Hung-Yu Cheng, Taipei (TW); Tzu-Huan Chiu, Taichung (TW); Shuo-Wen Chang, Kaohsiung (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/669,704

(22) Filed: Mar. 26, 2015

(65) Prior Publication Data

US 2016/0070281 A1   Mar. 10, 2016

(30) Foreign Application Priority Data

Sep. 10, 2014   (CN) .......................... 2014 1 0457831

(51) Int. Cl.
*H02M 3/156*   (2006.01)
*G05F 1/625*   (2006.01)

(52) U.S. Cl.
CPC ............... *G05F 1/625* (2013.01); *H02M 3/156* (2013.01)

(58) Field of Classification Search
CPC ............ H02M 2001/0003; H02M 2003/1557; H02M 3/156; H02M 3/1563; H02M 3/157; H02M 3/158; H02M 3/1588
USPC ........................................... 323/282, 284, 285
See application file for complete search history.

(56) References Cited

U.S. PATENT DOCUMENTS

| 8,742,743 | B2 * | 6/2014 | Seki ...................... | H02M 3/158 323/284 |
| 2008/0088292 | A1 * | 4/2008 | Stoichita ............... | H02M 3/156 323/285 |
| 2011/0109294 | A1 * | 5/2011 | Larson .................... | H02M 1/36 323/285 |

* cited by examiner

*Primary Examiner* — Gary L Laxton
(74) *Attorney, Agent, or Firm* — Birch, Stewart, Kolasch & Birch, LLP

(57) ABSTRACT

A control circuit of a power converter includes: an error detection circuit, configured to operably generate an error signal according to a reference signal and a feedback signal when coupling with an external feedback node of an external feedback circuit; an output signal detecting circuit, positioned inside the control circuit, configured to operably receive and detect an output signal of the power converter to generate a representative signal; an on time deciding circuit, coupled with the output signal detecting circuit, configured to operably generate an on time signal according to the representative signal; and a control signal generating circuit, coupled with the error detection circuit and the on time deciding circuit, configured to operably control on time of one or more power switches of the power converter according to the error signal and the on time signal.

9 Claims, 8 Drawing Sheets

CONTROL CIRCUIT OF POWER CONVERTER

CROSS-REFERENCE TO RELATED APPLICATIONS

This application claims the benefit of priority to Patent Application No. 201410457831.1, filed in China on Sep. 10, 2014; the entirety of which is incorporated herein by reference for all purposes.

BACKGROUND

The disclosure generally relates to a power converter and, more particularly, to a control circuit applicable to the power converter using external resistors.

Power converters adopting the constant on time control scheme are widely applied in many fields since the constant on time control scheme has many advantages. In a conventional control circuit of the power converter, an error detection circuit is employed to detect the difference between a reference signal and a feedback signal, so that circuits in the subsequent stages can adjust the on time of the power switch according to the detection result of the error detection circuit.

In some power converters, the aforementioned feedback signal is generated by an external feedback circuit arranged outside the control circuit. The designer of the control circuit has to know the voltage-dividing ratio of the external feedback circuit used by a particular power converter and then adjusts the component parameters of the conventional control circuit in advance, so that the conventional control circuit can operate normally in the particular power converter. If the voltage-dividing ratio of the external feedback circuit can not be obtained before manufacturing the conventional control circuit, the conventional control circuit is not able to correctly estimate the magnitude of the output signal of the power converter through the feedback signal, and thus not able to correctly adjust the on time of the power switch.

In other words, the structure of the conventional control circuit is only applicable to particular power converters using the same structure of external feedback circuit, and not suitable to other power converter using an external feedback circuit having a different voltage-dividing ratio. Apparently, the application scope and application flexibility of the conventional control circuit are very restricted.

SUMMARY

An example embodiment of a control circuit of a power converter is disclosed. The power converter comprises an inductor, one or more power switches, and an external feedback circuit. The one or more power switches are utilized for controlling the inductor to store or release energy to convert an input signal into an output signal. The external feedback circuit is utilized for generating a feedback signal corresponding to a magnitude of the output signal. The control circuit comprises: an error detection circuit, configured to operably generate an error signal according to a reference signal and the feedback signal when coupling with an external feedback node of the external feedback circuit; an output signal detecting circuit, positioned inside the control circuit, configured to operably receive and detect the output signal to generate a representative signal; an on time deciding circuit, coupled with the output signal detecting circuit, configured to operably generate an on time signal according to the representative signal; and a control signal generating circuit, coupled with the error detection circuit and the on time deciding circuit, configured to operably control on time of the one or more power switches according to the error signal and the on time signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
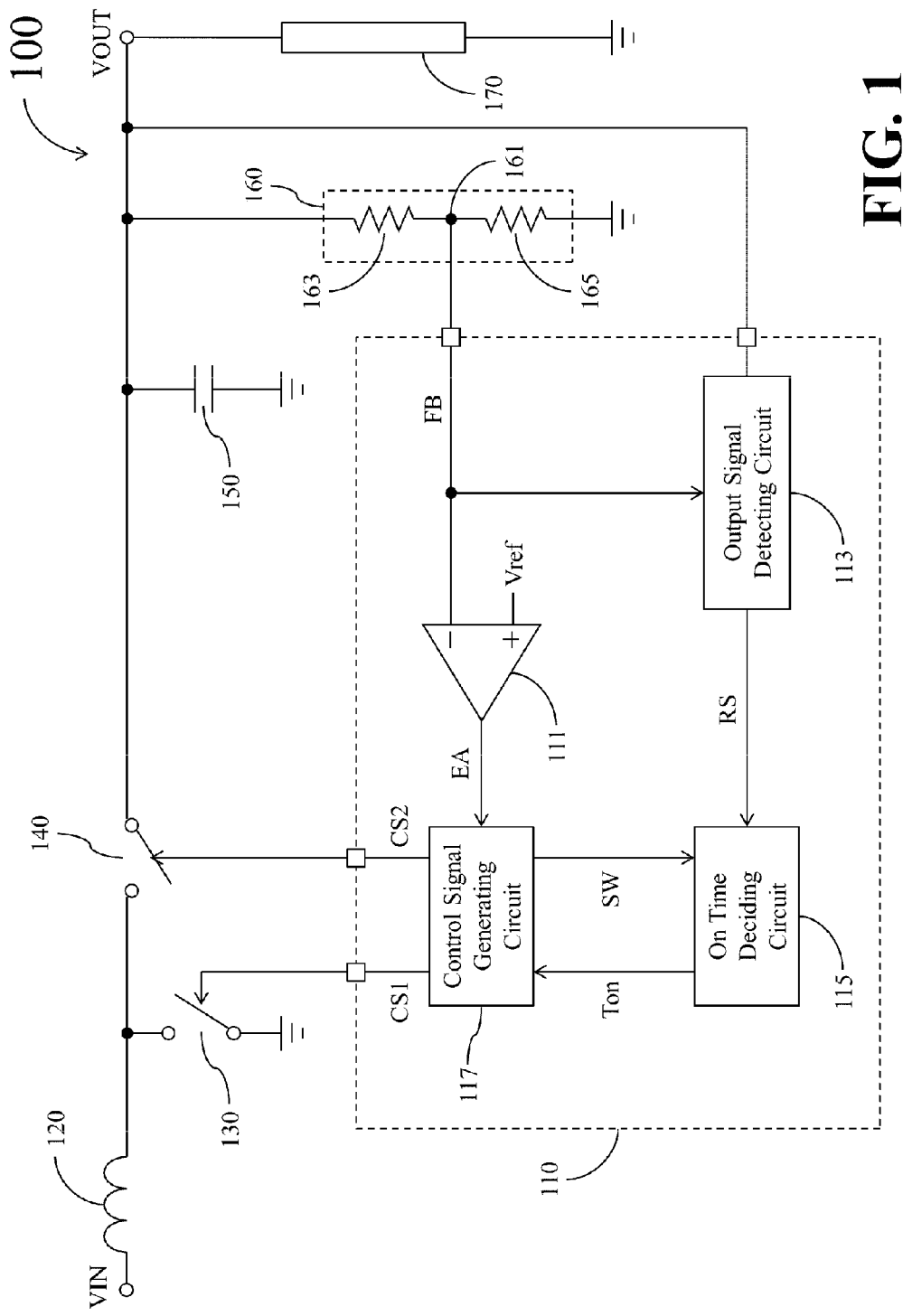
FIG. 1 shows a simplified functional block diagram of a power converter according to one embodiment of the present disclosure.

FIG. 1 shows a simplified functional block diagram of a power converter 100 according to one embodiment of the present disclosure. The power converter 100 comprises a control circuit 110, an inductor 120, one or more power switches, an output capacitor 150, and an external feedback circuit 160. In the embodiment of FIG. 1, the power converter 100 comprises a first power switch 130 and a second power switch 140. As shown, the power converter 100 is a synchronous-type boost power converter.

As shown in FIG. 1, a first terminal of the inductor 120 is utilized for coupling with an input signal VIN of the power converter 100. The first power switch 130 is coupled between a second terminal of the inductor 120 and a fixed-voltage terminal (e.g., a ground terminal). The second power switch 140 is coupled between the second terminal of the inductor 120 and a load 170 of the power converter 100. The output capacitor 150 is coupled between the load 170 and a fixed-voltage terminal (e.g., a ground terminal). The external feedback circuit 160 is utilized for generating a feedback signal FB corresponding to the magnitude of an output signal VOUT of the power converter 100.

For example, the external feedback circuit 160 of this embodiment comprises an external feedback node 161, a first external resistor 163, and a second external resistor 165. The first external resistor 163 is coupled between the load 170 and the external feedback node 161. The second external resistor 165 is coupled between the external feedback node 161 and a fixed-voltage terminal (e.g., a ground terminal). After the first external resistor 163 and the second external resistor 165 divide the output signal VOUT, the feedback signal FB having a predetermined proportional relationship with the magnitude of the output signal VOUT is formed at the external feedback node 161.

As shown in FIG. 1, the control circuit 110 of this embodiment comprises an error detection circuit 111, an output signal detecting circuit 113, an on time deciding circuit 115, and a control signal generating circuit 117.

In the control circuit 110, the error detection circuit 111 is configured to operably generate an error signal EA according to a reference signal Vref and the feedback signal FB when coupling with the external feedback node 161 of the external feedback circuit 160. The output signal detecting circuit 113 is positioned inside the control circuit 110 and configured to operably receive and detect the output signal VOUT to generate a representative signal RS. In the embodiment of FIG. 1, the output signal detecting circuit 113 is further configured to operably detect the feedback signal FB when coupling with the external feedback node 161, and to operably process the output signal VOUT according to the detection result of the feedback signal FB to generate the representative signal RS. The on time deciding circuit 115 is coupled with the output signal detecting circuit 113 and configured to operably generate an on time signal Ton according to the representative signal RS. The control signal generating circuit 117 is coupled with the error detection circuit 111 and the on time deciding circuit 115, and configured to operably control the on time of at least one of the power switches 130 and 140 according to the error signal EA and the on time signal Ton.

In this embodiment, the control circuit 110 configures the length of the on time of one of the power switches 130 and 140 to be directly proportional to a magnitude difference between the output signal VOUT and the input signal VIN while inversely proportional to the magnitude of the output signal VOUT. Meanwhile, the control circuit 110 configures the length of the off time of the other power switch to be directly proportional to the magnitude difference between the output signal VOUT and the input signal VIN while inversely proportional to the magnitude of the output signal VOUT. As described previously, in the situation where the voltage-dividing ratio of the external feedback circuit 160 cannot be obtained in advance, the control circuit 110 is not able to correctly estimate the magnitude of the output signal VOUT of the power converter 100 through the feedback signal FB.

In order to be capable of correctly adjusting the on time of the power switches 130 and 140, the control circuit 110 utilizes the output signal detecting circuit 113 to generate the representative signal RS for use in estimating the magnitude of the output signal VOUT.

Figure 2:
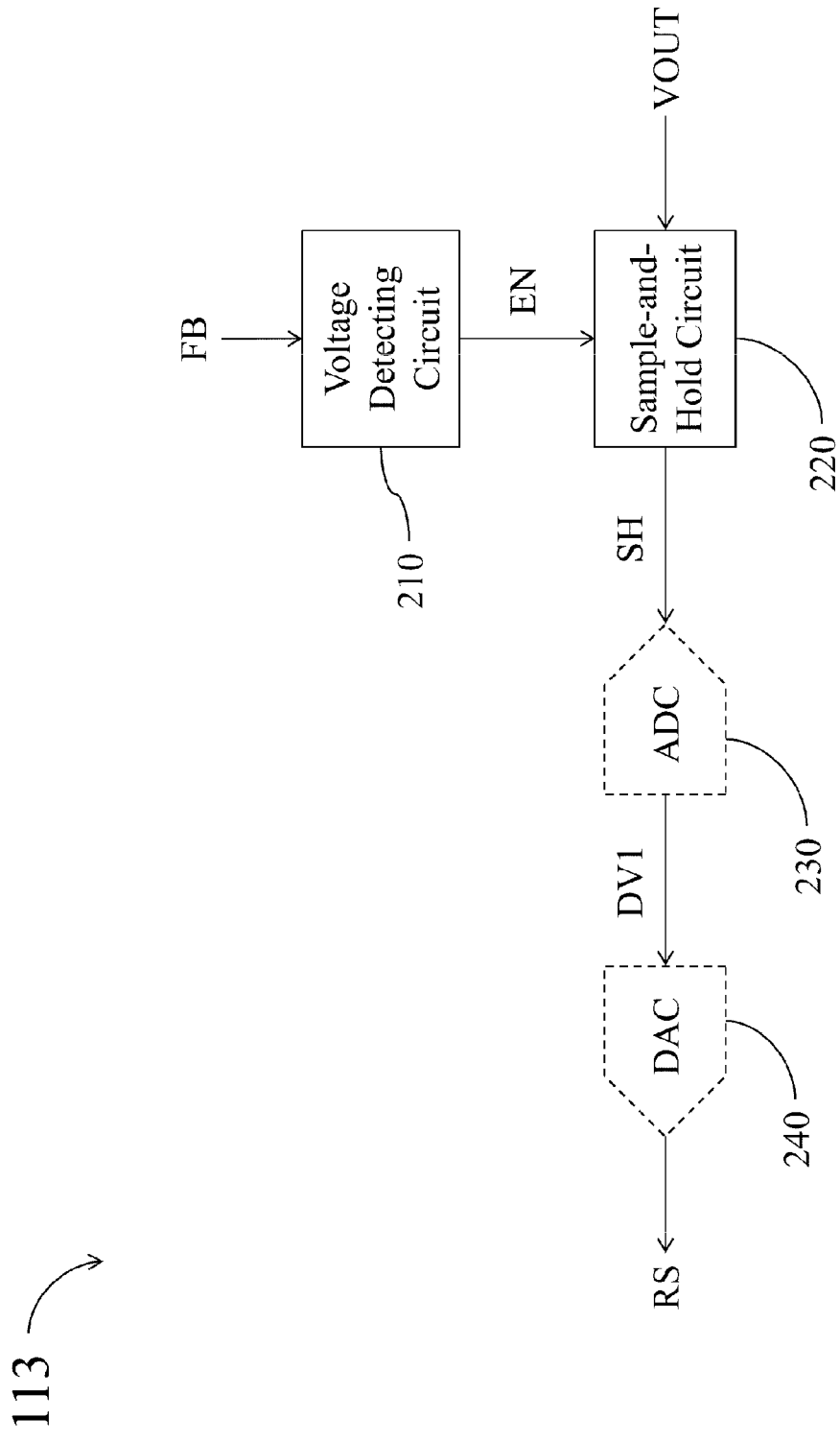
FIG. 2 shows a simplified functional block diagram of an output signal detecting circuit in FIG. 1 according to another embodiment of the present disclosure.

Please refer to FIG. 2, which shows a simplified functional block diagram of the output signal detecting circuit 113 in FIG. 1 according to another embodiment of the present disclosure. In the embodiment of FIG. 2, the output signal detecting circuit 113 comprises a voltage detecting circuit 210, a sample-and-hold circuit 220, an ADC 230, and a first DAC 240.

The voltage detecting circuit 210 is configured to operably detect the feedback signal FB to generate an enable signal EN when coupling with the external feedback node 161. The sample-and-hold circuit 220 is coupled with the voltage detecting circuit 210 and configured to operably conduct a sample-and-hold operation on the output signal VOUT to generate a sampled signal SH when coupling with the enable signal EN. The ADC 230 is coupled with the sample-and-hold circuit 220 and configured to operably generate a first digital control value DV1 according to the sampled signal SH. The first DAC 240 is coupled with the ADC 230 and configured to operably convert the first digital control value DV1 into the representative signal RS in the form of an analog signal.

The voltage detecting circuit 210 may generate an active pulse to be the enable signal EN at each time the magnitude of the feedback signal FB reaches a predetermined voltage level. In practice, the voltage detecting circuit 210 may generate an active pulse to be the enable signal EN at each time the feedback signal FB raises to a predetermined voltage from a relatively lower voltage level. Alternatively, the voltage detecting circuit 210 may generate an active pulse to be the enable signal EN at each time the feedback signal FB drops to the predetermined voltage from a relatively higher voltage level. The predetermined voltage level may vary with the circuit design requirement. The aforementioned relatively lower voltage level may be a voltage level which is equal to the result of the predetermined voltage level subtracted by a fixed value. The aforementioned relatively higher voltage level may be a voltage level which is equal to the result of the predetermined voltage level added by a fixed value. For example, the aforementioned predetermined voltage level may be any voltage level between 0.1V and 0.5V, the aforementioned relatively lower voltage level may be a voltage level which is equal to the result of the predetermined voltage level subtracted by 0.02V, 0.05V, or 0.1V, while the aforementioned relatively higher voltage level may be a voltage level which is equal to the result of the predetermined voltage level added by 0.02V, 0.05V, or 0.1V. In practice, the aforementioned predetermined voltage level may be configured to be 0V to simplify the design complexity of the voltage detecting circuit 210.

In the output signal detecting circuit 113, the magnitude of the sampled signal SH generated by the sample-and-hold circuit 220 when triggered by the enable signal EN has a proportional correlation with the magnitude of the output signal VOUT of the power converter 100. Accordingly, the sampled signal SH may be regarded as a representative signal for the output signal VOUT of the power converter 100 to a certain extent. As a result, the magnitude of the first digital control value DV1 generated based on the sampled signal SH and the magnitude of the representative signal RS generated based on the first digital control value DV1 both have a proportional correlation with the magnitude of the output signal VOUT of the power converter 100 to a certain extent. In operations, circuits in the subsequent stages may estimate the magnitude of the output signal VOUT based on the magnitude of the representative signal RS.

As described previously, since the magnitude of the sampled signal SH has a proportional correlation with the magnitude of the output signal VOUT of the power converter 100. In practice, the circuit structure of the output signal detecting circuit 113 may be simplified by utilizing the sampled signal SH to be the representative signal RS to thereby omit the ADC 230 and the first DAC 240 of the output signal detecting circuit 113.

In the control circuit 110, the on time deciding circuit 115 is further configured to operably generate a target signal LX corresponding to the input signal VIN. In addition, the on time deciding circuit 115 may configure an active pulse width of the on time signal Ton to be directly proportional to the magnitude difference between the representative signal RS and the target signal LX while configure the active pulse width of the on time signal Ton to be inversely proportional to the magnitude of the representative signal RS. As a result, it renders the on time signal Ton to have an active pulse width which is directly proportional to the magnitude difference between the output signal VOUT and the input signal VIN and inversely proportional to the magnitude of the output signal VOUT.

Figure 3:
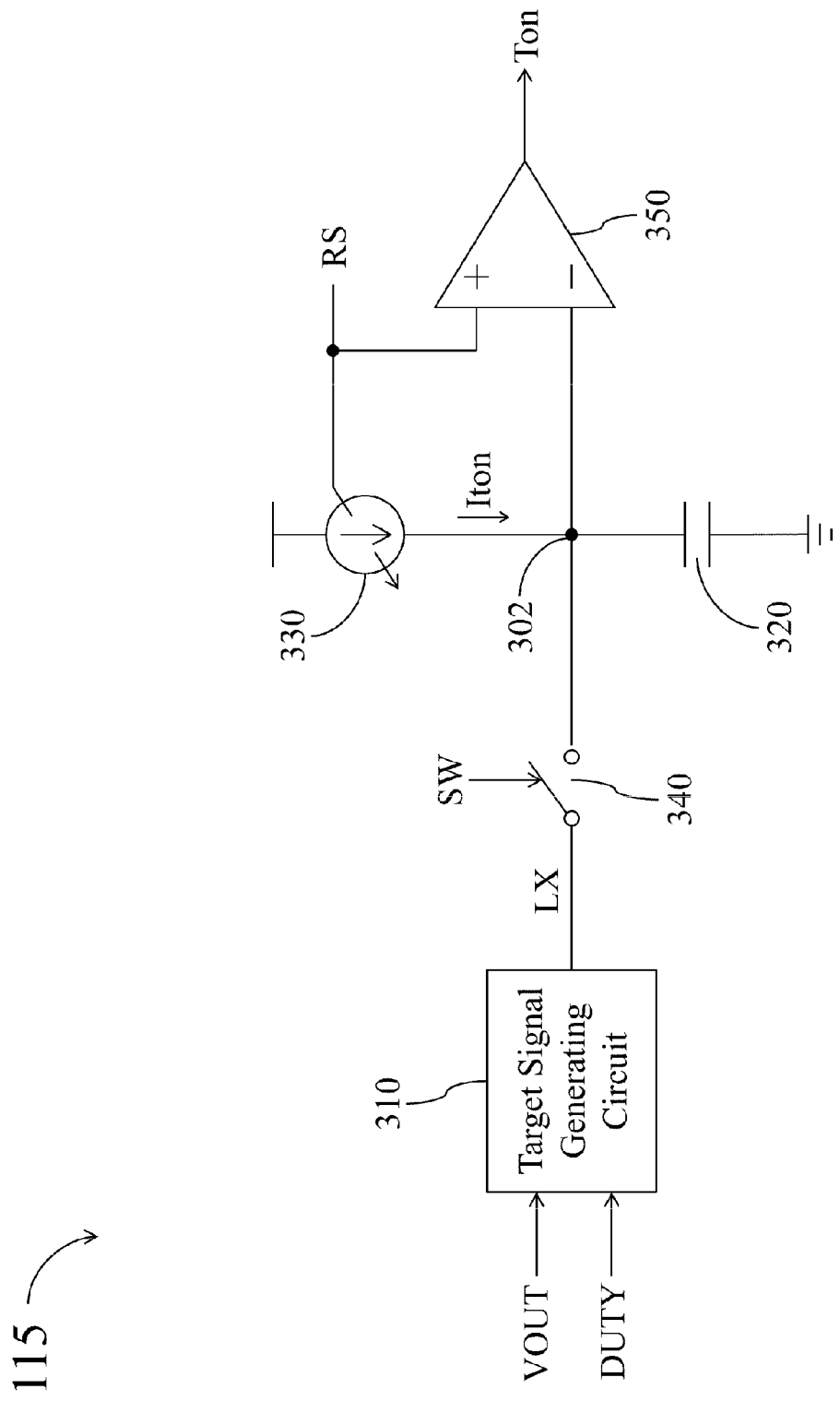
FIG. 3 shows a simplified functional block diagram of an on time deciding circuit in FIG. 1 according to another embodiment of the present disclosure.

Please refer to FIG. 3, which shows a simplified functional block diagram of the on time deciding circuit 115 in FIG. 1 according to another embodiment of the present disclosure. The on time deciding circuit 115 comprises an internal node 302, a target signal generating circuit 310, a capacitor 320, a first current source 330, a switch device 340, and a second comparison circuit 350.

The target signal generating circuit 310 is configured to operably generate a target signal LX corresponding to the input signal VIN of the power converter 100. The capacitor 320 is coupled between the internal node 302 and a fixed-voltage terminal (e.g., a ground terminal). The first current source 330 is coupled with the output signal detecting circuit 113. The first current source 330 is configured to operably generate a predetermined current Iton according to the representative signal RS, and output the predetermined current Iton to the internal node 302. The switch device 340 is positioned on a signal path between the target signal generating circuit 310 and the internal node 302, and is controlled by the control signal generating circuit 117. The second comparison circuit 350 is coupled with the internal node 302, the output signal detecting circuit 113, and the control signal generating circuit 117. The second comparison circuit 350 is configured to operably compare a signal at the internal node 302 with the representative signal RS and to operably generate the on time signal Ton according to the comparison result.

In the embodiment of FIG. 3, the target signal generating circuit 310 indirectly estimates the magnitude of the input signal VIN of the power converter 100 according to the output signal VOUT of the power converter 100 and a duty cycle signal DUTY, and generates the corresponding target signal LX accordingly. The duty cycle signal DUTY is utilized for representing the duty cycle of the first power switch 130. The target signal generating circuit 310 may generate a product of the output signal VOUT multiplied by the aforementioned duty cycle to be the target signal LX, and utilize the resulting target signal LX to estimate the magnitude of the input signal VIN. In practice, the duty cycle signal DUTY provided to the target signal generating circuit 310 may be generated by the control signal generating circuit 117 using various existing approaches.

In another embodiment, the target signal generating circuit 310 may be instead designed to directly sense the input signal VIN of the power converter 100 by using various existing approaches so as to generate the target signal LX whose magnitude has a proportional correlation with the magnitude of the input signal VIN.

In the on time deciding circuit 115, the representative signal RS coupled with a non-invert terminal of the second comparison circuit 350 can be regarded as a representative signal of the output signal VOUT of the power converter 100 to a certain extent. On the other hand, the signal at the internal node 302 can be regarded as a representative signal of the input signal VIN of the power converter 100 to a certain extent. Accordingly, the circuits in the subsequent stages are allowed to estimate the magnitude of the output signal VOUT based on the magnitude of the representative signal RS. The second comparison circuit 350 may configure the on time signal Ton to an active state when the representative signal RS is greater than the signal at the internal node 302, and switch the on time signal Ton to an inactive state when the representative signal RS is less than the signal at the internal node 302. Therefore, the active pulse width of the on time signal Ton generated by the second comparison circuit 350 would be directly proportional to the difference between the input signal VIN and the output signal VOUT of the power converter 100 while inversely proportional to the magnitude of the output signal VOUT.

In operations, the control signal generating circuit 117 generates the first control signal CS1 and the second control signal CS2 according to the error signal EA and the on time signal Ton, and utilizes the first control signal CS1 and the second control signal CS2 to respectively control the on time of the first power switch 130 and the on time of the second power switch 140. When the control signal generating circuit 117 utilizes the first control signal CS1 to turn on the first power switch 130, the control signal generating circuit 117 utilizes the second control signal CS2 to turn off the second power switch 140. When the control signal generating circuit 117 utilizes the first control signal CS1 to turn off the first power switch 130, the control signal generating circuit 117 utilizes the second control signal CS2 to turn on the second power switch 140.

In this embodiment, the control signal generating circuit 117 turns off the switch device 340 of the on time deciding circuit 115 while turns on the first power switch 130. In addition, the control signal generating circuit 117 turns on the switch device 340 while turns off the first power switch 130. In practice, depending upon the implementation of the switch device 340, the control signal generating circuit 117 may simply utilize one of the first control signal CS1 and the second control signal CS2 to be a switch control signal SW for controlling the operation of the switch device 340.

In some embodiments, the control circuit 110 may adopt the current mode control scheme. In this situation, the control signal generating circuit 117 may utilize various existing circuit structures to detect the current passing through the signal path between the second terminal of the inductor 120 and the load 170 to generate a detection signal (not shown). For example, the control signal generating circuit 117 may detect the valley values of the through current from the second power switch 140 to the load 170 to generate the detection signal. Alternatively, the control signal generating circuit 117 may instead detect the valley values of the through current from the second terminal of the inductor 120 to the second power switch 140 to generate the detection signal. Then, the control signal generating circuit 117 may compare the detection signal with the error signal EA and generate the first control signal CS1 and the second control signal CS2 according to the comparison result and the on time signal Ton to respectively control the on time of the first power switch 130 and the on time of the second power switch 140. For example, the control signal generating circuit 117 may utilize various existing PWM signal generating circuits (not shown) or PFM signal generating circuits (not shown) to generate the first control signal CS1 and the second control signal CS2.

In other embodiments, the control circuit 110 may adopt the voltage mode control scheme. In this situation, the control signal generating circuit 117 may utilize various existing circuit structures to generate a periodic signal (not shown) according to the input signal VIN of the power converter 100, the output signal VOUT of the power converter 100, a particular reference signal, or other adequate signal. In practice, the aforementioned periodic signal may have a triangular waveform, a ramp waveform, a sine waveform, or any other adequate periodical waveform. Then, the control signal generating circuit 117 may compare the periodic signal with the error signal EA and generate the first control signal CS1 and the second control signal CS2 according to the comparison result and the on time signal Ton to respectively control the on time of the first power switch 130 and the on time of the second power switch 140. Similarly, the control signal generating circuit 117 may utilize various existing PWM signal generating circuits (not shown) or PFM signal generating circuits (not shown) to generate the first control signal CS1 and the second control signal CS2.

As described previously, the circuits in the control circuit 110 may estimate the magnitude of the output signal VOUT according to the aforementioned sampled signal SH or representative signal RS. The on time signal Ton generated by the on time deciding circuit 115 represents the difference between the input signal VIN and the output signal VOUT of the power converter 100 to a certain extent. Therefore, without knowing the voltage-dividing ratio of the external feedback circuit 160, the control signal generating circuit 117 can still correctly control the on time of the first power switch 130 and the second power switch 140 according to the error signal EA and the on time signal Ton.

In other words, the disclosed control circuit 110 is also applicable to other power converter adopting different structure of external feedback circuit, and thus the control circuit 110 has a much wider application scope than the conventional control circuit.

Different functional blocks of the power converter 100 may be realized with separate circuits or may be integrated into a single circuit chip. For example, all the functional blocks of the control circuit 110 may be integrated into a single controller IC. In addition, at least one of the first power switch 130 and the second power switch 140 may be integrated into the control circuit 110 to form a single converter IC.

Figure 4:
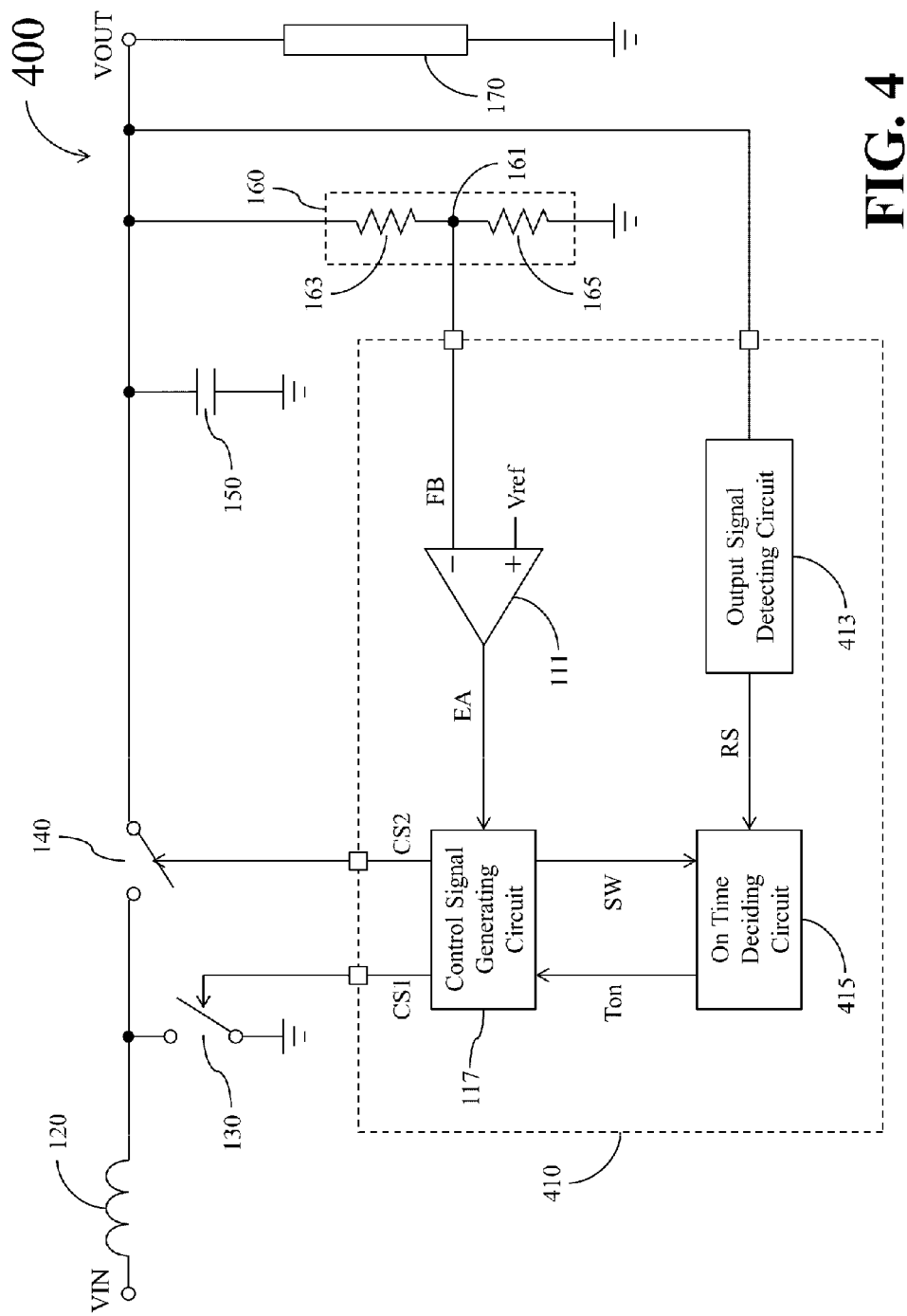
FIG. 4 shows a simplified functional block diagram of a power converter according to another embodiment of the present disclosure.

FIG. 4 shows a simplified functional block diagram of a power converter 400 according to another embodiment of the present disclosure. The power converter 400 is similar to the power converter 100 described previously, and thus the descriptions regarding the implementations and operations of the inductor 120, the first power switch 130, the second power switch 140, the output capacitor 150, and the external feedback circuit 160 of the power converter 100 are also applicable to the corresponding components in the power converter 400. A major difference between the power converter 400 and the power converter 100 is that the structure of a control circuit 410 of the power converter 400 is somewhat different from that of the aforementioned control circuit 110.

The control circuit 410 of the power converter 400 comprises an output signal detecting circuit 413, an on time deciding circuit 415, and the aforementioned error detection circuit 111 and control signal generating circuit 117. In the control circuit 410, the output signal detecting circuit 413 is positioned inside the control circuit 110 and configured to operably receive and detect the output signal VOUT to generate a representative signal RS. The on time deciding circuit 415 is coupled with the output signal detecting circuit 413 and configured to operably generate an on time signal Ton according to the representative signal RS. However, in comparison with the aforementioned output signal detecting circuit 113, the output signal detecting circuit 413 of the control circuit 410 does not detect the feedback signal FB and does not process the output signal VOUT based on the detection result of the feedback signal FB.

In this embodiment, the control circuit 410 configures the length of the on time of one of the power switches 130 and 140 to be directly proportional to a magnitude difference between the output signal VOUT and the input signal VIN while inversely proportional to the magnitude of the output signal VOUT. Meanwhile, the control circuit 410 configures the length of the off time of the other power switch to be directly proportional to the magnitude difference between the output signal VOUT and the input signal VIN while inversely proportional to the magnitude of the output signal VOUT. Similar to the previous embodiment, in the situation where the voltage-dividing ratio of the external feedback circuit 160 cannot be obtained in advance, the control circuit 410 is not able to correctly estimate the magnitude of the output signal VOUT of the power converter 400 through the feedback signal FB.

In order to be capable of correctly adjusting the on time of the power switches 130 and 140, the control circuit 410 utilizes the output signal detecting circuit 413 to generate the representative signal RS for use in estimating the magnitude of the output signal VOUT.

The foregoing descriptions regarding the implementations, operations, and related advantages of the error detection circuit 111 and the control signal generating circuit 117 of the aforementioned control circuit 110 are also applicable to the corresponding components in the control circuit 410. For the sake of brevity, those descriptions will not be repeated here.

Figure 5:
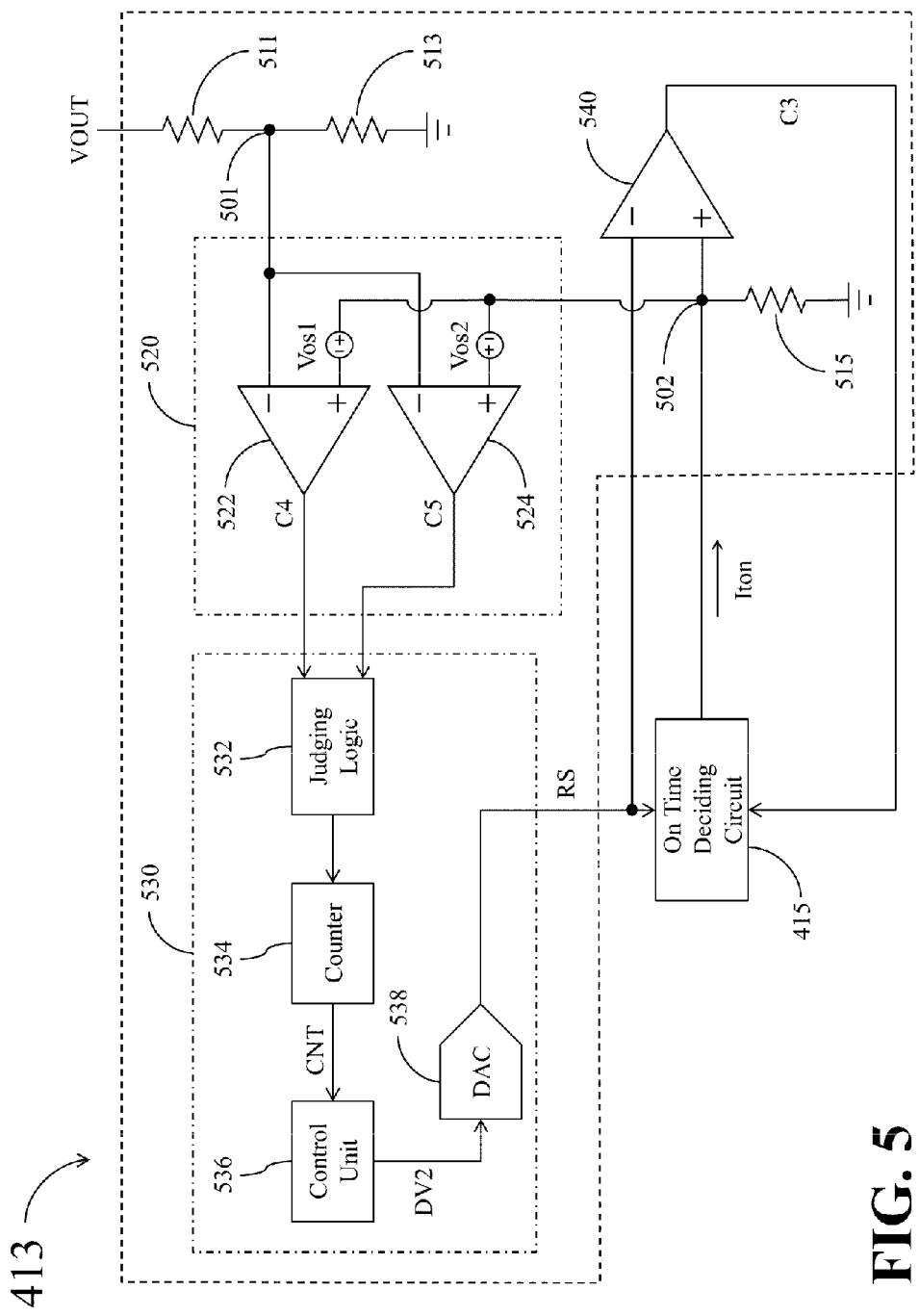
FIG. 5 shows a simplified functional block diagram of an output signal detecting circuit in FIG. 4 according to another embodiment of the present disclosure.

Please refer to FIG. 5, which shows a simplified functional block diagram of the output signal detecting circuit 413 in FIG. 4 according to another embodiment of the present disclosure.

As shown in FIG. 5, the output signal detecting circuit 413 comprises a first node 501, a second node 502, a first internal resistor 511, a second internal resistor 513, a third internal resistor 515, a comparing module 520, a representative signal generating circuit 530, and a third comparison circuit 540.

In the output signal detecting circuit 413, the first internal resistor 511 is coupled between the first node 501 and an input terminal of the output signal detecting circuit 413. The second internal resistor 513 is coupled between the first node 501 and a fixed-voltage terminal (e.g., a ground terminal). The third internal resistor 515 is coupled between the second node 502 and a fixed-voltage terminal (e.g., a ground terminal). The comparing module 520 is coupled with the first node 501 and the second node 502, and configured to operably generate one or more comparison signals according to the signals at the first node 501 and the second node 502. The representative signal generating circuit 530 is coupled with the comparing module 520 and the on time deciding circuit 415, and is configured to operably generate the representative signal RS according to the one or more comparison signals generated by the comparing module 520. The third comparison circuit 540 is coupled with the second node 502, the representative signal generating circuit 530, and the on time deciding circuit 415. The third comparison circuit 540 is configured to operably compare the representative signal RS with the signal at the second node 502 to generate and output a third comparison signal C3 to the on time deciding circuit 415. In this embodiment, the third internal resistor 515 and the second internal resistor 513 have the same resistance.

After the first internal resistor 511 and the second internal resistor 513 divide the output signal VOUT, a voltage-divided signal having a predetermined proportional relationship with the magnitude of the output signal VOUT is formed at the first node 501. Accordingly, the signal at the first node 501 can be regarded as a representative signal of the output signal VOUT of the power converter 400 to a certain extent.

As shown in FIG. 5, the on time deciding circuit 415 generates a predetermined current Iton according to the representative signal RS and outputs the predetermined current Iton to the second node 502 of the output signal detecting circuit 413. Accordingly, the signal at the second node 502 can be regarded as a target voltage signal corresponding to the output signal VOUT of the power converter 400 to a certain extent.

In the embodiment of FIG. 5, the comparing module 520 comprises a fourth comparison circuit 522 and a fifth comparison circuit 524. The fourth comparison circuit 522 is coupled with the first node 501 and configured to operably compare a first signal with the first node 501 to generate a fourth comparison signal C4. The aforementioned first signal is a resulting signal obtained by adjusting the signal at the second node 502 with a first predetermined offset Vos1. The fifth comparison circuit 524 is coupled with the first node 501 and configured to operably compare a second signal with the first node 501 to generate a fifth comparison signal C5. The aforementioned second signal is a resulting signal obtained by adjusting the signal at the second node 502 with a second predetermined offset Vos2. In practice, the magnitude of the first predetermined offset Vos1 may be the same as or may be different from the magnitude of the second predetermined offset Vos2. In addition, the polarity of the first predetermined offset Vos1 may be the same as or may be opposing to the polarity of the second predetermined offset Vos2.

The use of the first predetermined offset Vos1 and the second predetermined offset Vos2 effectively increases the error tolerance capability of the comparing module 520, thereby preventing the output signal detecting circuit 413 from erroneously operating.

In practice, the representative signal generating circuit 530 may be realized with a combination of various digital logic circuits. For example, in the embodiment of FIG. 5, the representative signal generating circuit 530 comprises a judging logic 532, a counter 534, a control unit 536, and a second DAC 538. The judging logic 532 is coupled with the output of the comparing module 520. The counter 534 is coupled with the judging logic 532 and configured to operably generate a counter value CNT under control of the judging logic 532. The control unit 536 is coupled with the output of the counter 534 and configured to operably generate a second digital control value DV2 according to the counter value CNT. The second DAC 538 is coupled with the control unit 536 and configured to operably convert the second digital control value DV2 into the representative signal RS in the form of an analog signal.

In operations, the judging logic 532 controls the counter 534 to adjust the counter value CNT according to the one or more comparison signals generated by the comparing module 520.

For example, in the embodiments where the comparing module 520 comprises the fourth comparison circuit 522 and the fifth comparison circuit 524, the judging logic 532 may control the counter 534 to change the counter value CNT at each time the fourth comparison circuit 522 and the fifth comparison circuit 524 have the same output polarity. The control unit 536 then adjusts the second digital control value DV2 according to the changed counter value CNT.

In one embodiment, for example, each time the outputs of the fourth comparison circuit 522 and the fifth comparison circuit 524 both have a positive polarity, the judging logic 532 controls the counter 534 to increase the counter value CNT, and the control unit 536 correspondingly increases the second digital control value DV2 according to the increased counter value CNT. Similarly, each time the outputs of the fourth comparison circuit 522 and the fifth comparison circuit 524 both have a negative polarity, the judging logic 532 controls the counter 534 to decrease the counter value CNT, and the control unit 536 correspondingly decreases the second digital control value DV2 according to the decreased counter value CNT.

Alternatively, the judging logic 532 may control the counter 534 to change the counter value CNT only when the fourth comparison circuit 522 and the fifth comparison circuit 524 have the same output polarity for a predetermined number of continuous cycles. In this way, the frequency of adjusting the second digital control value DV2 conducted by the control unit 536 can be reduced, thereby reducing the negative impact to the loop response of the control circuit 410.

For example, in another embodiment, the judging logic 532 controls the counter 534 to increase the counter value CNT only when the outputs of the fourth comparison circuit 522 and the fifth comparison circuit 524 both have a positive polarity for a predetermined number of continuous cycles. In another embodiment, the judging logic 532 controls the counter 534 to decrease the counter value CNT only when the outputs of the fourth comparison circuit 522 and the fifth comparison circuit 524 both have a positive polarity for a predetermined number of continuous cycles.

It can be appreciated from the foregoing elaboration that the output signal detecting circuit 413 of the control circuit 410 generates a corresponding voltage-divided signal (e.g., the voltage signal at the first node 501) according to the output signal VOUT. The output signal detecting circuit 413 also generates a target voltage signal (e.g., the voltage signal at the second node 502) of the output signal VOUT, and generates the representative signal RS according to the voltage-divided signal and the target voltage signal. In addition, the output signal detecting circuit 413 compares the representative signal RS with the target voltage signal, and adopts a feedback control scheme to adjust the target voltage signal according to the comparison result of the representative signal RS and the target voltage signal. As a result, it renders the target voltage signal to follow the representative signal RS to thereby reduce the possibility of that the representative signal RS varies with the voltage-divided signal.

In the control circuit 410, the on time deciding circuit 415 is further configured to operably generate a target signal LX corresponding to the input signal VIN. In addition, the on time deciding circuit 415 may configure an active pulse width of the on time signal Ton to be directly proportional to the magnitude difference between the representative signal RS and the target signal LX while configure the active pulse width of the on time signal Ton to be inversely proportional to the magnitude of the representative signal RS. As a result, it renders the on time signal Ton to have an active pulse width which is directly proportional to the magnitude difference between the output signal VOUT and the input signal VIN and inversely proportional to the magnitude of the output signal VOUT.

Figure 6:
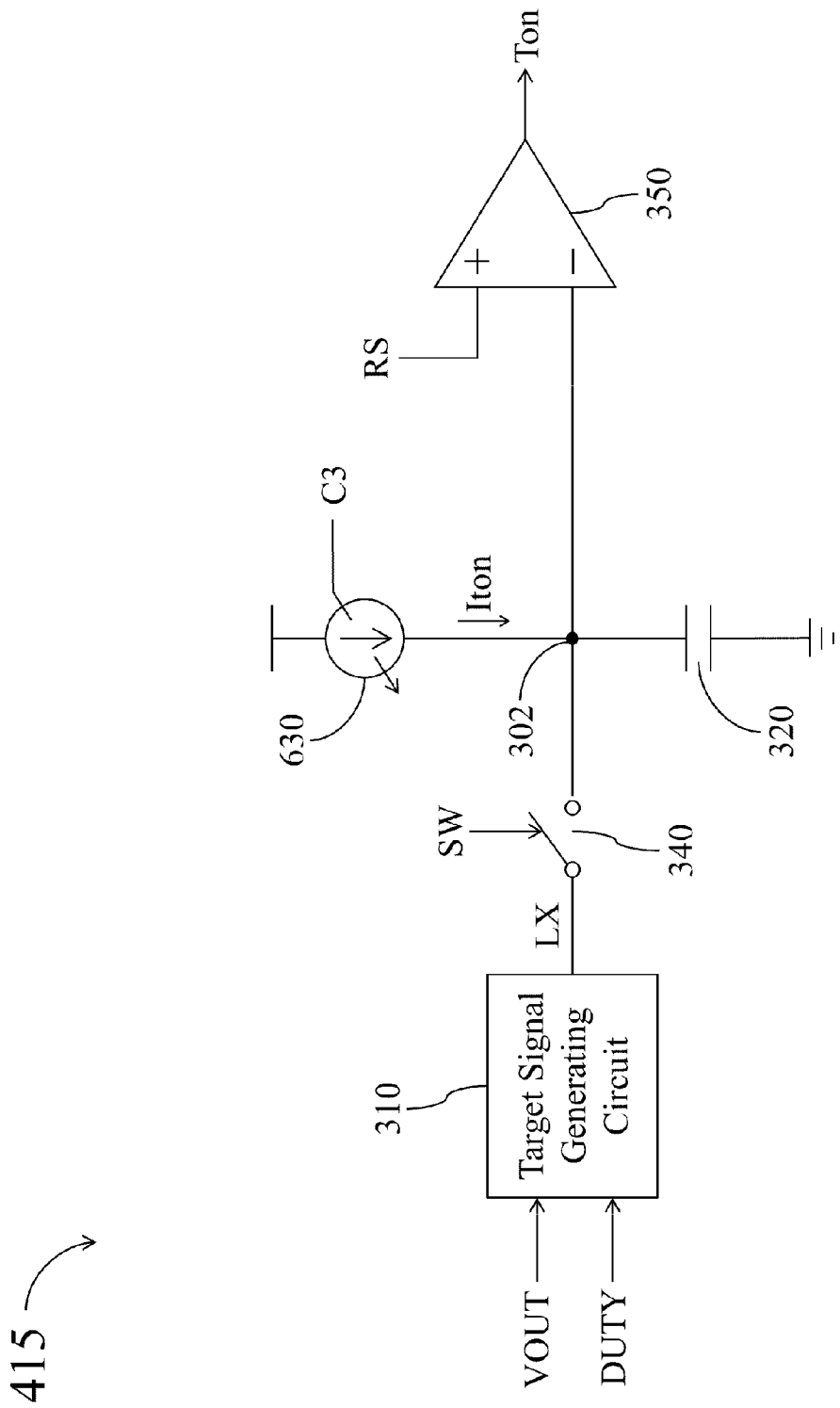
FIG. 6 shows a simplified functional block diagram of an on time deciding circuit in FIG. 4 according to another embodiment of the present disclosure.

Please refer to FIG. 6, which shows a simplified functional block diagram of the on time deciding circuit 415 in FIG. 4 according to another embodiment of the present disclosure. The on time deciding circuit 415 comprises a second current source 630, the internal node 302, the target signal generating circuit 310, the capacitor 320, the switch device 340, and the second comparison circuit 350. The foregoing descriptions regarding the implementations, operations, and related advantages of the internal node 302, the target signal generating circuit 310, the capacitor 320, the switch device 340, and the second comparison circuit 350 in FIG. 3 are also applicable to the corresponding components in the on time deciding circuit 415. For the sake of brevity, those descriptions will not be repeated here.

In the on time deciding circuit 415, the second current source 630 is coupled with the third comparison circuit 540 of the output signal detecting circuit 413. The second current source 630 is configured to operably generate the predetermined current Iton according to the third comparison signal C3 generated by the third comparison circuit 540, and to operably output the predetermined current Iton to the internal node 302.

Similar to the previous embodiment, the representative signal RS coupled with a non-invert terminal of the second comparison circuit 350 can be regarded as a representative signal of the output signal VOUT of the power converter 400 to a certain extent. On the other hand, the signal at the internal node 302 can be regarded as a representative signal of the input signal VIN of the power converter 400 to a certain extent. Accordingly, the circuits in the subsequent stages are allowed to estimate the magnitude of the output signal VOUT based on the magnitude of the representative signal RS. The second comparison circuit 350 may configure the on time signal Ton to an active state when the representative signal RS is greater than the signal at the internal node 302, and switch the on time signal Ton to an inactive state when the representative signal RS is less than the signal at the internal node 302. Therefore, the active pulse width of the on time signal Ton generated by the second comparison circuit 350 would be directly proportional to the difference between the input signal VIN and the output signal VOUT of the power converter 400 while inversely proportional to the magnitude of the output signal VOUT.

As described previously, the circuits in the control circuit 410 may estimate the magnitude of the output signal VOUT according to the representative signal RS. The on time signal Ton generated by the on time deciding circuit 415 represents the difference between the input signal VIN and the output signal VOUT of the power converter 400 to a certain extent. Therefore, without knowing the voltage-dividing ratio of the external feedback circuit 160, the control signal generating circuit 117 of the control circuit 410 can still correctly control the on time of the first power switch 130 and the second power switch 140 according to the error signal EA and the on time signal Ton.

In other words, the disclosed control circuit 410 is also applicable to other power converter adopting different structure of external feedback circuit, and thus the control circuit 410 has a much wider application scope than the conventional control circuit.

Different functional blocks of the power converter 400 may be realized with separate circuits or may be integrated into a single circuit chip. For example, all the functional blocks of the control circuit 410 may be integrated into a single controller IC. In addition, at least one of the first power switch 130 and the second power switch 140 may be integrated into the control circuit 410 to form a single converter IC.

In the foregoing embodiment of FIG. 5, the comparing module 520 is realized with a combination of two comparison circuits. This is merely an exemplary embodiment, rather than a restriction to the practical implementation of the comparing module 520. In practice, the comparing module 520 may be instead realized with a single comparison circuit for comparing the signal at the first node 501 with the second node 502 to generate a corresponding comparison signal.

Additionally, in the embodiment of FIG. 5, the representative signal generating circuit 530 is realized with digital circuits. This is merely an exemplary embodiment, rather than a restriction to the practical implementation of the representative signal generating circuit 530. In practice, the representative signal generating circuit 530 may be instead realized with analog circuits having similar functionalities to generate the representative signal RS according to the comparison result of the comparing module 520.

In practice, the comparison circuits in the previous embodiments may be realized with the same or similar circuit structures, or may be realized with different circuit structures depending upon the circuit design requirements.

In addition, in some embodiments, the second power switch 140 in the power converter 100 or 400 may be replaced by a diode. That is, the disclosed control circuits 110 and 410 are also applicable to asynchronous-type power converters. In this situation, the control circuit 110 or 410 needs not to output the second control signal CS2, and thus the corresponding signal pin can be omitted.

In the foregoing elaborations, the control circuits 110 and 410 are utilized in the boost power converters, but this is merely for illustrative purpose, rather than a restriction to the practical applications of the control circuits 110 and 410. In practice, the control circuit 110 or 410 described previously is also applicable to buck power converters.

Figure 7:
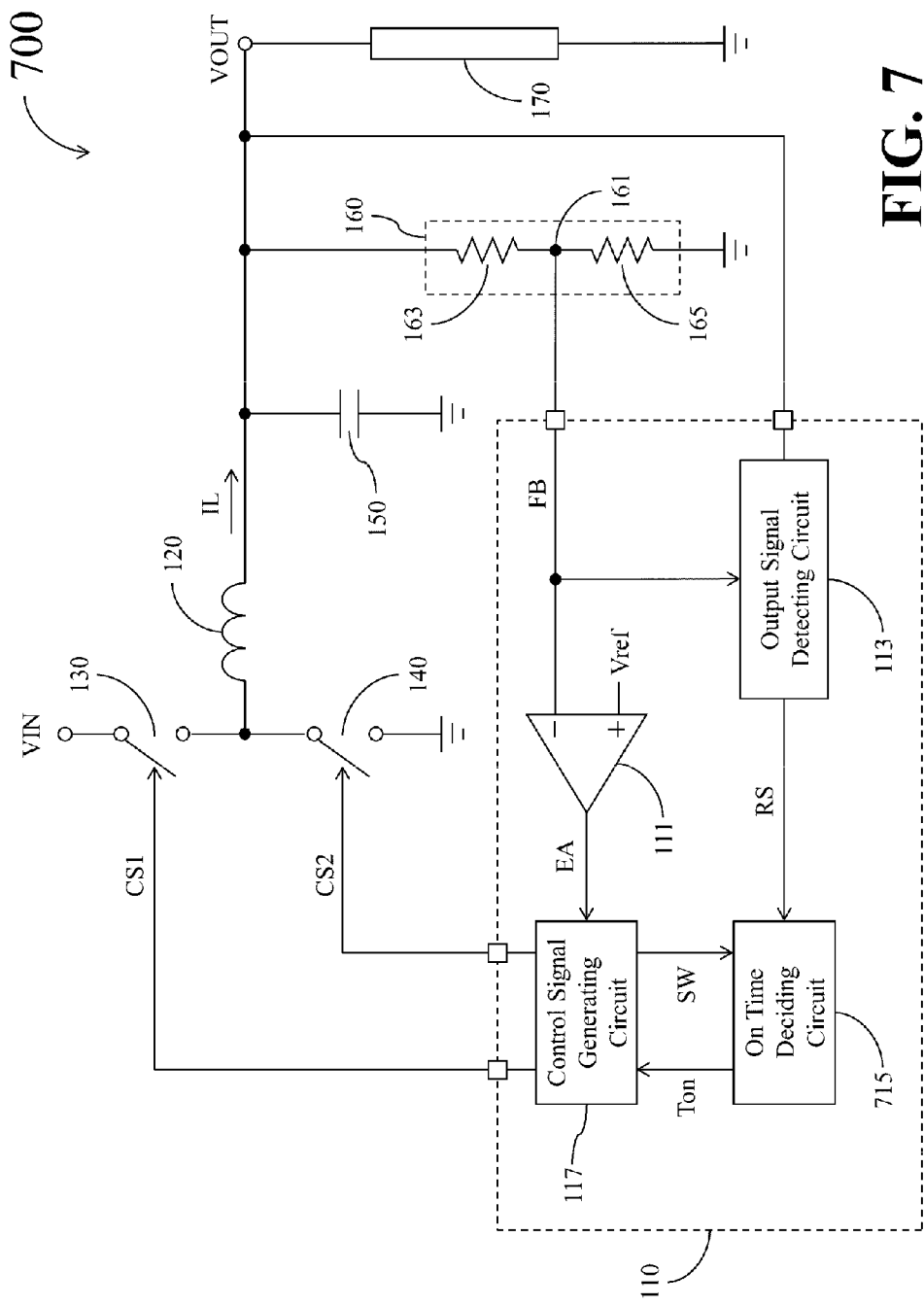
FIG. 7 and FIG. 8 show simplified functional block diagrams of power converters according to different embodiments of the present disclosure.

For example, FIG. 7 shows a simplified functional block diagram of a power converter 700 according to another embodiment of the present disclosure. The power converter 700 comprises the control circuit 110, the inductor 120, the first power switch 130, the second power switch 140, the output capacitor 150, and the external feedback circuit 160. As shown, the power converter 700 is a synchronous-type buck power converter.

In the embodiment of FIG. 7, the first power switch 130 is coupled between the first terminal of the inductor 120 and the input signal VIN. The second power switch 140 is coupled between the first terminal of the inductor 120 and a fixed-voltage terminal (e.g., a ground terminal). The output capacitor 150 is coupled between the second terminal of the inductor 120 and the load 170. The external feedback circuit 160 is utilized for generating the feedback signal VFB corresponding to the magnitude of the output signal VOUT of the power converter 700. The first power switch 130 and the second power switch 140 are utilized for controlling the inductor 120 to store and release energy to convert the input signal VIN into the output signal VOUT.

The control circuit 110 of the power converter 700 has a structure similar to the control circuit 110 in FIG. 1, but operates in a way somewhat different from the control circuit 110 in FIG. 1. Specifically, the control circuit 110 of the power converter 700 comprises the error detection circuit 111, the output signal detecting circuit 113, an on time deciding circuit 715, and the control signal generating circuit 117. The control circuit 110 configures the length of the on time of one of the power switches 130 and 140 to be directly proportional to the magnitude of the output signal VOUT while inversely proportional to the magnitude of the input signal VIN. Meanwhile, the control circuit 110 configures the length of the off time of the other power switch to be directly proportional to the magnitude of the output signal VOUT while inversely proportional to the magnitude of the input signal VIN. As described previously, in the situation where the voltage-dividing ratio of the external feedback circuit 160 cannot be obtained in advance, the control circuit 110 is not able to correctly estimate the magnitude of the output signal VOUT of the power converter 700 through the feedback signal FB.

In order to be capable of correctly adjusting the on time of the power switches 130 and 140, the control circuit 110 also utilizes the output signal detecting circuit 113 to generate the representative signal RS for use in estimating the magnitude of the output signal VOUT. In the control circuit 110, the on time deciding circuit 715 is configured to operably generate a target signal LX corresponding to the input signal VIN. In addition, the on time deciding circuit 715 also configures an active pulse width of the on time signal Ton to be directly proportional to the magnitude of the representative signal RS while configures the active pulse width of the on time signal Ton to be inversely proportional to the magnitude of the target signal LX. As a result, it renders the on time signal Ton to have an active pulse width which is directly proportional to the magnitude of the output signal VOUT and inversely proportional to the magnitude of the input signal VIN.

Figure 8:
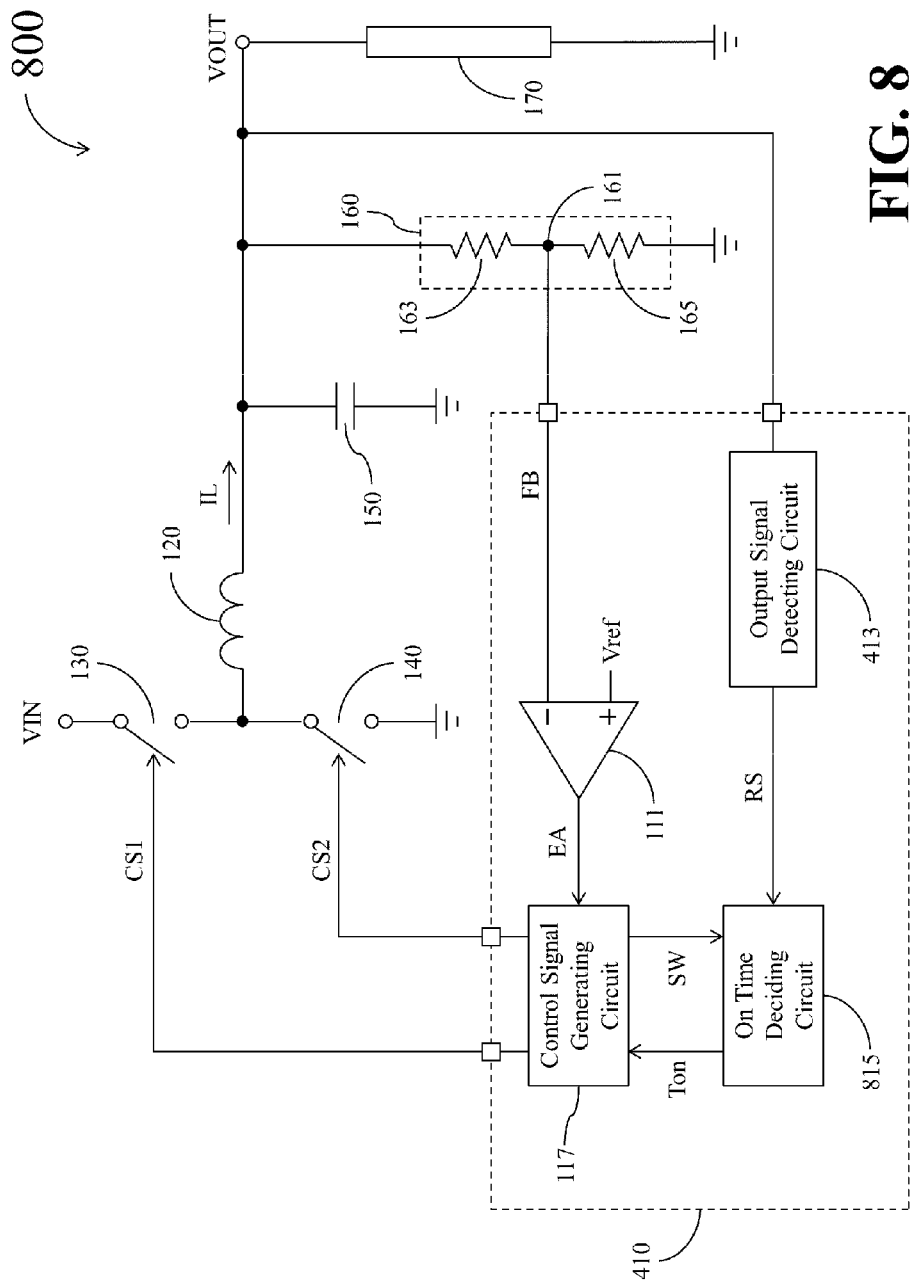

In another example, FIG. 8 shows a simplified functional block diagram of a power converter 800 according to another embodiment of the present disclosure. The power converter 800 comprises the control circuit 410, the inductor 120, the first power switch 130, the second power switch 140, the output capacitor 150, and the external feedback circuit 160. As shown, the power converter 800 is also a synchronous-type buck power converter.

The structure of the power converter 800 is similar to the power converter 700 of FIG. 7, and thus the foregoing descriptions regarding the connection relationships, implementations, and operation of the inductor 120, the first power switch 130, the second power switch 140, the output capacitor 150, and the external feedback circuit 160 of the power converter 700 are also applicable to the corresponding components in the power converter 800.

The control circuit 410 of the power converter 800 has a structure similar to the control circuit 410 in FIG. 4, but operates in a way somewhat different from the control circuit 410 in FIG. 4. Specifically, the control circuit 410 of the power converter 800 comprises the error detection circuit 111, the output signal detecting circuit 413, an on time deciding circuit 815, and the control signal generating circuit 117. The control circuit 410 configures the length of the on time of one of the power switches 130 and 140 to be directly proportional to the magnitude of the output signal VOUT while inversely proportional to the magnitude of the input signal VIN. Meanwhile, the control circuit 410 configures the length of the off time of the other power switch to be directly proportional to the magnitude of the output signal VOUT while inversely proportional to the magnitude of the input signal VIN. As described previously, in the situation where the voltage-dividing ratio of the external feedback circuit 160 cannot be obtained in advance, the control circuit 410 is not able to correctly estimate the magnitude of the output signal VOUT of the power converter 800 through the feedback signal FB.

In order to be capable of correctly adjusting the on time of the power switches 130 and 140, the control circuit 410 also utilizes the output signal detecting circuit 413 to generate the representative signal RS for use in estimating the magnitude of the output signal VOUT. In the control circuit 410, the on time deciding circuit 815 is configured to operably generate a target signal LX corresponding to the input signal VIN. In addition, the on time deciding circuit 815 also configures an active pulse width of the on time signal Ton to be directly proportional to the magnitude of the representative signal RS while configures the active pulse width of the on time signal Ton to be inversely proportional to the magnitude of the target signal LX. As a result, it renders the on time signal Ton to have an active pulse width which is directly proportional to the magnitude of the output signal VOUT and inversely proportional to the magnitude of the input signal VIN.

In addition, in some embodiments, the second power switch 140 in the power converter 700 or 800 may be replaced by a diode. That is, the disclosed control circuits 110 and 410 are also applicable to asynchronous-type buck power converters. In this situation, the control circuit 110 or 410 needs not to output the second control signal CS2, and thus the corresponding signal pin can be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a power converter, the power converter comprising an inductor, one or more power switches, and an external feedback circuit, wherein the one or more power switches are utilized for controlling the inductor to store or release energy to convert an input signal into an output signal, and the external feedback circuit is utilized for generating a feedback signal corresponding to a magnitude of the output signal, the control circuit comprising:
    an error detection circuit, configured to operably generate an error signal according to a reference signal and the feedback signal when coupling with an external feedback node of the external feedback circuit;
    an output signal detecting circuit, positioned inside the control circuit, configured to operably receive and detect the output signal to generate a representative signal;
    an on time deciding circuit, coupled with the output signal detecting circuit, configured to operably generate an on time signal according to the representative signal; and
    a control signal generating circuit, coupled with the error detection circuit and the on time deciding circuit, configured to operably control on time of the one or more power switches according to the error signal and the on time signal.

2. The control circuit of claim 1, wherein the output signal detecting circuit is further configured to operably detect the feedback signal when coupling with the external feedback node, and to operably process the output signal according to a detection result of the feedback signal to generate the representative signal.

3. The control circuit of claim 2, wherein the output signal detecting circuit comprises:
    a voltage detecting circuit, configured to operably detect the feedback signal to generate an enable signal when coupling with the external feedback node; and
    a sample-and-hold circuit, coupled with the voltage detecting circuit, configured to operably conduct a sample-and-hold operation on the output signal when triggered by the enable signal.

4. The control circuit of claim 3, wherein the voltage detecting circuit is configured to operably generate the enable signal at each time a magnitude of the feedback signal reaches a predetermined voltage level.

5. The control circuit of claim 2, wherein the on time deciding circuit is further configured to operably generate a target signal corresponding to the input signal, and the on time deciding circuit configures an active pulse width of the on time signal to be directly proportional to a magnitude difference between the representative signal and the target signal while configures the active pulse width of the on time signal to be inversely proportional to a magnitude of the representative signal.

6. The control circuit of claim 2, wherein the on time deciding circuit is further configured to operably generate a target signal corresponding to the input signal, and the on time deciding circuit configures an active pulse width of the on time signal to be directly proportional to a magnitude of the representative signal while configures the active pulse width of the on time signal to be inversely proportional to a magnitude of the target signal.

7. The control circuit of claim 1, wherein the output signal detecting circuit is configured to operably conduct following operations:
    generating a corresponding voltage-divided signal according to the output signal;
    generating a target voltage signal corresponding to the output signal;
    generating the representative signal according to the voltage-divided signal and the target voltage signal;
    comparing the representative signal with the target voltage signal; and
    adopting a feedback control scheme to adjust the target voltage signal according to a comparison result of the representative signal and the target voltage signal to render the target voltage signal to follow the representative signal.

8. The control circuit of claim 7, wherein the on time deciding circuit is further configured to operably generate a target signal corresponding to the input signal, and the on time deciding circuit configures an active pulse width of the on time signal to be directly proportional to a magnitude difference between the representative signal and the target signal while configures the active pulse width of the on time signal to be inversely proportional to a magnitude of the representative signal.

9. The control circuit of claim 7, wherein the on time deciding circuit is further configured to operably generate a target signal corresponding to the input signal, and the on time deciding circuit configures an active pulse width of the on time signal to be directly proportional to a magnitude of the representative signal while configures the active pulse width of the on time signal to be inversely proportional to a magnitude of the target signal.

* * * * *